United States Patent [19]

Yokonuma et al.

[11] Patent Number: 5,063,403
[45] Date of Patent: Nov. 5, 1991

[54] ELECTRONIC FLASH APPARATUS FOR CAMERA

[75] Inventors: Norikazu Yokonuma, Tokyo; Nobuyoshi Hagiuda, Kawasaki; Yoshikazu Iida, Chigasaki; Hiroshi Sakamoto, Kawasaki; Hideki Matsui, Yokohama, all of Japan

[73] Assignee: Nikon Corporation, Tokyo, Japan

[21] Appl. No.: 659,547

[22] Filed: Feb. 25, 1991

Related U.S. Application Data

[63] Continuation of Ser. No. 354,301, May 19, 1989, abandoned.

[30] Foreign Application Priority Data

May 23, 1988 [JP] Japan .................. 63-125571

[51] Int. Cl.⁵ .................... G03B 7/00; G03B 15/03
[52] U.S. Cl. .................... 354/413; 354/484; 354/127.1; 354/145.1; 354/416
[58] Field of Search .............. 354/413, 418, 145.1, 354/127.1, 127.11, 127.12, 127.13, 416, 417, 484

[56] References Cited

U.S. PATENT DOCUMENTS 4,573,786  3/1986  Taniguchi et al. ............... 354/416
4,695,148  9/1987  Terui et al. .................... 354/413
4,804,991  2/1989  Ishizuki et al. ................. 354/403

FOREIGN PATENT DOCUMENTS 58-62633  7/1983  Japan .

Primary Examiner—W. B. Perkey
Assistant Examiner—Cassandra C. Spyrou
Attorney, Agent, or Firm—Shapiro and Shapiro

[57] ABSTRACT

An electronic flash apparatus is capable of discriminating the presence or absence of connection to a camera, and also the state of a connected camera. When the flash apparatus is connected to a camera capable of information transfer, the time required to transfer information is minimal. At least some of the terminals that connect the flash apparatus to the camera perform multiple functions. Different currents are supplied to certain terminals depending upon whether a connected camera is in an information transfer state or a flash photographing state. Terminal voltage detection controls certain functions, including varying certain terminal voltage.

8 Claims, 8 Drawing Sheets

ELECTRONIC FLASH APPARATUS FOR CAMERA

This is a continuation of application Ser. No. 354,301 filed May 19, 1989, now abandoned.

BACKGROUND OF THE INVENTION

1. Field of the Invention

The present invention relates to an electronic flash apparatus to be connected, in use, to a camera.

2. Related Background Art

As a terminal for electrically connecting a camera with an electronic flash unit, there is already known a terminal, known as X-contact, for instructing start of flash emission from the camera to the electronic flash unit.

Also there are known a ready terminal for sending a predetermined signal from the electronic flash unit to the camera when a main capacitor of the electronic flash unit is charged to a predetermined voltage; a stop terminal for sending a signal from the camera for terminating the flash emission of the electronic flash unit; and a terminal for mutually communicating the performance of the camera and the electronic flash unit, such as the possibility of TTL light control.

In recent systematization of the camera and the electronic flash unit, various data on the flash unit including not only the above-mentioned charge signal but also a maximum light amount signal and data signals for light amount control and various data on the camera such as the diaphragm aperture and the film sensitivity become necessary for automation and diversification of flash photography, and such data have to be exchanged between the camera and the flash unit.

Consequently new terminals for transmitting such data may be added.

A method of multiplexing the signals transmitted by each terminal by adding digital signals to the conventional signals, thereby transmitting a large amount of data, is disclosed in U.S. Pat. No. 4,695,148, and a method of displaying such data is disclosed in U.S. Pat. No. 4,573,786.

Also there is known a method of photographing with flash, called daylight flash photography. Since the background of the object is of a high luminance, the photographing condition is apt to be influenced by the background illumination, and the amount of flash light emission from the flash unit may be terminated before reaching the appropriate amount, due to the influence of the background illumination for example if the measurement of luminance of the object is initiated prior to the start of flash light emission.

In order to prevent such phenomenon, U.S. Pat. No. 4,695,148 discloses a method of starting the measurement of luminance of the object simultaneously with the flash light emission from the electronic flash unit. This method also enables the transmission of digital signals, and enables sending information on the timing of starting the luminance measurement.

However such conventional technologies as explained above are associated with the following drawbacks.

In the apparatus for daylight flash photography, disclosed in U.S. Pat. No. 4,695,148, the electronic flash unit is unable to distinguish the current status thereof if it is not connected to the camera or if the power supply of the camera connected thereto is turned off.

More specifically, even when the electronic flash unit is connected to a camera capable of data transmission, the flash unit cannot identify whether the power supply of the camera is turned off or it is connected to a camera without data transmitting function.

This drawback is likewise present in the technology disclosed in U.S. Pat. No. 4,573,786. In the apparatus disclosed in that Patent, a display is made on the flash unit on the data transmitted from the camera, or on the data determined by another method if data transmission is not made from the camera. However, if the power supply of the camera connected to the flash unit is turned off or if the flash unit is not connected to the camera, the flash unit is unable to identify the proper display to make and may show an erroneous display.

Also certain cameras with an accessory shoe are so constructed that the electrical connection with the electronic flash unit is made through a connector other than the accessory shoe. In such cameras, the accessory shoe is generally made of metal, and, when the electronic flash unit is mounted on such accessory shoe, the contacts, provided in the flash unit for electrical connections with the camera, are all grounded.

Consequently the electronic flash unit becomes inoperable, but the flash unit is unable to understand such state and is therefore unable to provide an alarm.

In the apparatus disclosed in U.S. Pat. No. 4,695,148 in which the signal exchange between the camera and the flash unit is conducted by multiplex digital signals and the timing of start of light measurement is transmitted from the flash unit, there is required a time for distinguishing the sequence for exchange of digital signals from the sequence for transmitting the timing of start of light measurement, since both sequences are switched by the duration of L-level state of a signal terminal. Particularly the transmission of the timing of start of light measurement is conducted when the shutter is released, so that the time from the release of shutter to the light emission of the flash unit becomes extended. Consequently there is required a significant time lag from the shutter release by the operator to the actual photographing operation.

Also, the sequence may be mistaken if the response of the flash unit is delayed, as two sequences are distinguished only by time.

Furthermore the exchange sequence of the digital signals is unilaterally initiated by the camera, and the digital signals are transmitted irrespective of the connected flash unit. Consequently if for example a flash unit with auxiliary light for auto focusing as disclosed in U.S. Pat. No. 4,804,991 is mounted, the auxiliary light becomes unnecessarily turned on.

Also in case the number of flash units is increased under TTL light control as disclosed in Japanese Laid-open Patent Sho 58-62633, the stop terminals are connected in parallel. Thus an increase of the current in the stop terminals gives rise to an increase in the current flowing into the camera in the photographing operation with an increased number of flash units, and the camera may become unable to output a flash stop signal, for terminating the flash emission, by because the voltage may drip to the L-level through sinking of the current in the stop terminal, as the current exceeds the sinking ability.

SUMMARY OF THE INVENTION

In consideration of the foregoing, an object of the present invention is to provide an electronic flash apparatus capable of discriminating and displaying the presence or absence of connection to a camera and the state of the connected camera.

Another object of the present invention is to provide an electronic flash apparatus capable of reducing the time required for data transfer or data transmission and preventing erroneous operation of the flash apparatus by giving response to a request from the camera for data transfer and then receiving data transfer.

Still another object of the present invention is to provide an electronic flash apparatus capable of clearly separating the data transfer sequence from the sequence for transmitting the timing of start of light measurement and enabling high-speed data transfer, by selective current injection to two connecting terminals between the camera and the flash apparatus.

Still another object of the present invention is to provide an electronic flash apparatus capable, by information transfer conducted through at least a terminal, of discriminating the state of a camera connected to the terminal.

The electronic flash apparatus of the invention is connected to a camera by a plurality of terminals, at least some of which perform multiple functions. In accordance with one aspect of the invention, a terminal inputs a light stop signal from the camera to the electronic flash apparatus for stopping a flashing operation and also serves to transfer information to the camera from the electronic flash apparatus. If the camera is in an information transfer state, a first current is supplied to the terminal, and if the camera is in a flash photographing state, a second current, lower than the first current, is supplied to the terminal.

In accordance with another aspect of the invention, a terminal transfers a change completion signal to the camera from the electronic flash apparatus and also serves to transfer information to the electronic flash apparatus. A first current is supplied to the terminal when the camera is in an information transfer state, and a second current, lower than the first current, is supplied to the terminal when the camera is in a flash photographing state.

In accordance with still another aspect of the invention, a camera has a circuit which operates when a power source supplies power thereto. At least one terminal serves to transmit information from the camera to an electronic flash apparatus regarding flash photography. Detecting means detects the voltage of at least one terminal, and discriminating means responsive to the detecting means discriminates whether or not the camera can transfer information regarding flash photography when the power source does not supply power to the aforesaid circuit.

In accordance with yet another aspect of the invention, an electronic flash apparatus is used with a camera that selectively assumes an information transfer state or a flash photographing state and comprises a monitor terminal, a light stop terminal, and a charge completion terminal, the charge completion terminal serving to receive a shutter release signal from the camera. Information transfer between the camera and the electronic flash apparatus is conducted through the light stop and charge completion terminals when the camera is in the information transfer state, while in the flash photographing state, a light stop signal and a charge completion signal are applied, respectively, to the light stop terminal and the charge completion terminal. Voltage varying means varies voltage applied to the light stop terminal. First voltage detecting means detects voltage applied to the monitor terminal, and second voltage detecting means detects voltage applied to the charge completion terminal. The first voltage detecting means, upon detection of a change in the voltage on the monitor terminal, causes the voltage varying means to change the voltage on the light stop terminal for a predetermined period and causes the second voltage detecting means to inspect the voltage on the charge completion terminal. If the second voltage detecting means detects a change in the voltage on the charge completion terminal, by the receiving thereon of the shutter release signal of the camera during the predetermined period, it identifies that the camera is in the flash photographing state. Otherwise it identifies that the camera is in the information transfer state.

DESCRIPTION OF THE PREFERRED EMBODIMENTS

In the following there will be explained the structure of the electronic flash apparatus of the present invention (hereinafter simply called flash unit) and the function thereof, with reference to FIG. 1.

Figure 1:
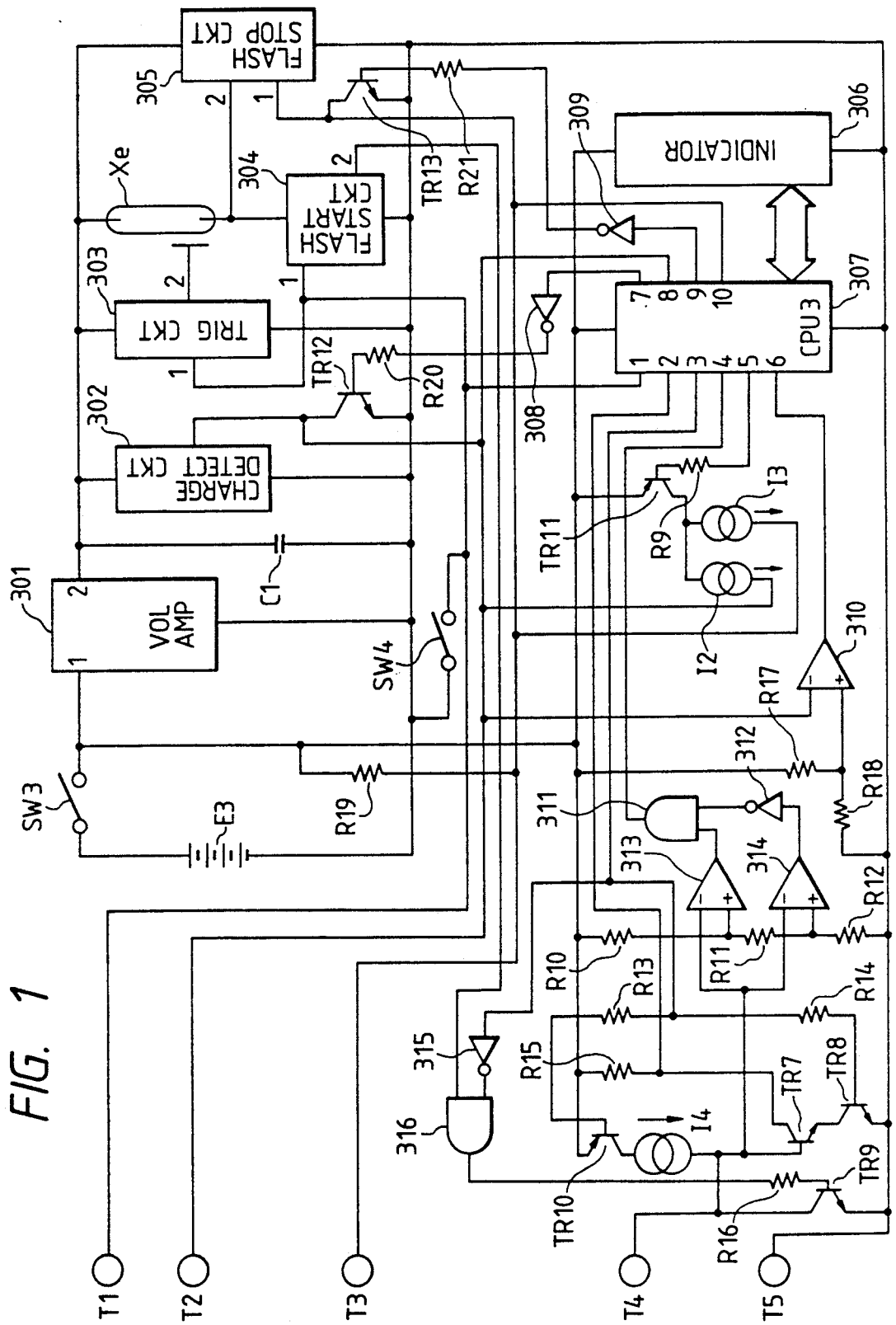
FIG. 1 is a circuit diagram of an electroflash apparatus embodying the present invention.

Referring to FIG. 1, when a power switch SW3 is closed, the electric current is supplied from a power source E3 to various units to activate the flash unit, whereby a voltage elevating circuit 301 elevates the power supply voltage supplied to an input terminal 1 and outputs it from an output terminal 2. A main capacitor C1 is charged with the elevated output voltage of the elevating circuit 301. When the voltage of the charged main capacitor C1 reaches a predetermined value corresponding to a flash enabling voltage or a charge completion voltage, this state is detected by a charge detection circuit 302, which in response outputs an H-level ready signal to a ready terminal T2.

During the presence of the H-level ready signal at the ready terminal T2, if an L-level X-contact signal is supplied from the camera to an X-contact terminal T1 or if the X-contact terminal T1 assumes an L-level by the closing of a test switch SW4 provided in the flash unit, an L-level signal is supplied to an input line 1 of a trigger circuit 303, which thus outputs a high voltage pulse to a trigger output line 2, thus triggering a xenon discharge tube Xe.

The L-level X-contact signal is also supplied to an input line 1 of a flash starting circuit 304, whereby circuit 304 completes a loop for discharging the energy of the main capacitor C1 through the xenon discharge tube Xe. Thus the xenon discharge tube Xe emits flash light, dissipating the energy charged in the main capacitor C1. The flash starting circuit 304 detects the current for flash emission in the xenon discharge tube Xe, and outputs a flash start signal from an output line 2 when the flash is emitted from the xenon discharge tube Xe.

The L-level X-contact signal is further supplied to an interruption port 1 of a CPU 3 (307).

If an L-level flash terminating signal is supplied from the camera to a stop terminal T3 during the flash emission from the xenon discharge tube Xe, this signal is supplied to an input line 1 of a flash stop circuit 305, which inversely biases the flash start circuit 304 through an output line 2, thereby terminating the flash emission of the xenon discharge tube Xe.

An output port 3 of the CPU 3 is normally maintained at the H-level, whereby a transistor TR8 is turned on.

If the camera connected to the flash unit has the TTL light control function and is capable of TTL light control, the camera provides a monitor terminal T4 with a current, which is supplied to the base of a transistor TR7. Thus transistor TR7 is turned on to send an L-level signal to an input port 2 of the CPU 3, thus advising that a camera capable of TTL light control is connected.

The current supplied to the monitor terminal T4 from the camera flows from the base of the transistor TR7 to the emitter thereof, and further to the collector and emitter of the transistor TR8. Thus the voltage at the monitor terminal T4 is equal to the sum of the base-emitter voltage of the transistor TR7 and the collector-emitter voltage of the transistor TR8, and becomes approximately equal to the forward voltage drop in a diode.

On the other hand, if the camera is not connected or if the power supply thereof is turned off, the transistor TR7 remains turned off due to the absence of current supply from the camera to the monitor terminal T4, so that an H-level signal is supplied to the input port 2 of the CPU 3, advising that the camera is not connected or the power supply thereof is turned off.

In the following there will be explained the operation for discriminating the state of connection of the flash unit when the CPU receives an H-level input, namely when the camera is not connected or the power supply thereof is turned off.

In response to an H-level signal to the input port 2, the CPU 3 outputs an L-level output to the output port 3. Thus a transistor TR10 is turned on to supply the monitor terminal T4 with a constant current I4. In this state, since the output port 3 of the CPU 3 is at the L-level, the transistor TR8 is turned off so that the transistor TR7 is also turned off. Consequently the current I4 does not have a load in the flash unit but flows in a load externally connected to the monitor terminal T4, so that the voltage thereof is determined by the externally connected load.

Figure 2:
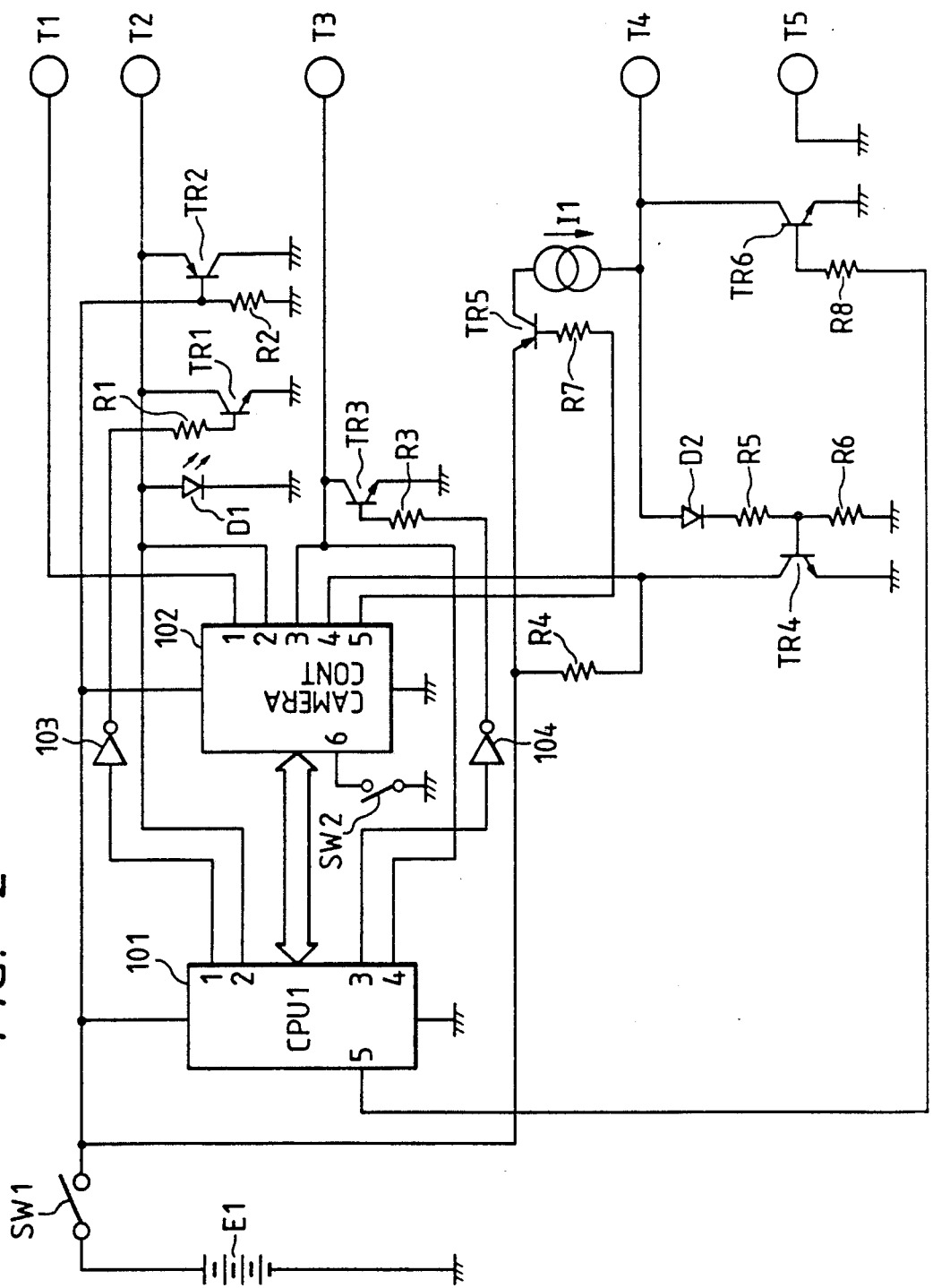
FIG. 2 is a circuit diagram of a camera having data transfer function.
Figure 3:
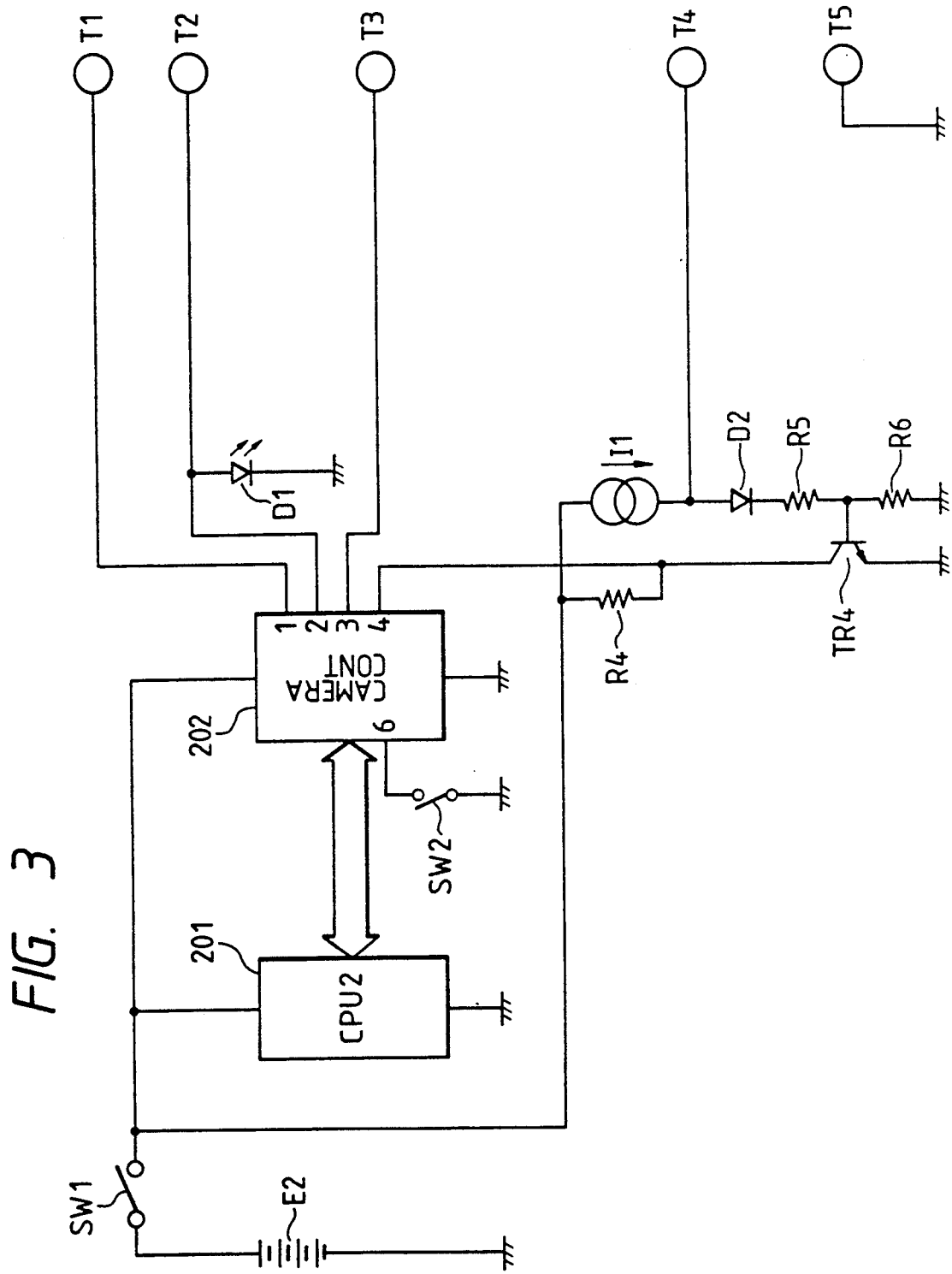
FIG. 3 is a circuit diagram of a conventional camera lacking data transfer function.

For example, if a camera capable of data transfer as shown in FIG. 2 or a conventional camera as shown in FIG. 3 is connected, the current from the monitor terminal T4 flows through a diode D2, a resistor R5, and the base and emitter of a transistor TR4. If the resistor R5 is so selected that the voltage drop therein is sufficiently smaller than that in the diode D2, the voltage of the monitor terminal T4 is approximately equal to that of two diodes connected serially.

When the flash unit shown in FIG. 1 is not connected to the camera, the voltage of the monitor terminal T4 is substantially equal to that of the power supply, because of lack of the load for the constant current I4.

In some cameras, the accessory shoe coming into contact with the base portion of the flash unit is entirely made of metal. Thus, when the flash unit is mounted on such metal accessory shoe, all the terminals T1-T5 of the flash unit are grounded. In such case the monitor terminal T4 assumes the ground potential.

Consequently, based on the foregoing, it is possible to discriminate whether the flash unit is connected to a camera capable of TTL light control, by measuring the voltage of the monitor terminal T4 when the constant current I4 is supplied thereto.

The discriminating circuit therefor is composed of resistors R10, R11, R12, comparators 313, 314, an inverter 312 and an AND gate 311. When a camera capable of TTL light control is connected, the voltage of the monitor terminal T4 with the constant current I4 therein is approximately equal, as explained before, to the voltage across two diodes connected serially, and is about 1.2 V. The threshold voltages of the comparators 313, 314, determined by the resistors R10, R11, R12, are selected at values well apart from the terminal voltage of 1.2 V when the camera capable of TTL light control is connected. For example the threshold voltage of the comparator 314 is selected as 0.6 V corresponding to a diode, while that of the comparator 313 is selected as 1.8 V corresponding to three diodes. Since the voltage of the monitor terminal T4 is 1.2 V when a camera capable of TTL light control is connected, the comparators 314, 313 respectively generate L-level and H-level output signals. As the output of the comparator 314 is inverted by the inverter 312, the AND gate 311 receives two H-level input signals and sends an H-level output signal to an input port 4 of the CPU.

Then, when the flash unit is not connected to the camera, the voltage of the monitor terminal T4 is approximately equal to the voltage of the power supply, so that the comparators 313, 314 both output L-level output signals. Consequently the AND gate 311 receives H- and L-level input signals and sends an L-level output signal to the input port 4 of the CPU 3.

Also in case the flash unit is connected to a camera with an accessory shoe entirely composed of metal, the voltage of the monitor terminal T4 is equal to the ground potential (0 V), so that the comparators 313, 314 both provide H-level output signals. Consequently the AND gate 311 receives H- and L-level input signals and sends an L-level signal to the input port 4 of the CPU 3.

Thus, if a current is not supplied to the monitor terminal T4 from the camera, it is possible to discriminate whether a camera capable of TTL light control is connected, by a current supply from the flash unit.

In the following there will be explained a process, to be executed when the connection of a camera capable of TTL light control is discriminated as explained above, for discriminating:
1) whether it is a camera capable of data transfer;
2) or it is a conventional camera;
3) or otherwise.

In the case 3), the process discriminates whether the flash unit is not connected to a camera, or it is connected to a camera with an accessory shoe of which contact surface with the flash unit is entirely made of a metal.

At first the CPU 3 outputs an L-level output signal from an output port 5, thereby turning on a transistor TR11, thus supplying the ready terminal T2 and the stop terminal T3 respectively with constant currents I2, I3.

A camera capable of data transfer is provided with a circuit, as shown in FIG. 2, composed of the ready terminal T2, a transistor TR2 and a resistor R2. When the constant current I2 is supplied from the flash unit to the ready terminal T2 while the power supply of the camera is turned off, a current flows from the emitter of the transistor TR2 to the base thereof and further to the resistor R2, whereby the transistor TR2 is activated in the active area thereof. The current in the resistor R2 is 1/hfe of the emitter-collector current of the transistor TR2, since the value of hfe of a transistor is about several hundred, the current in the resistor R2 is extremely small. Consequently the resistor R2 can be easily selected in such a manner that the voltage across resistor R2 is negligibly small in comparison with the base-emitter voltage of the transistor TR2, and the voltage of the ready terminal T2 becomes equal to about 0.6 V corresponding to a diode when the resistor R2 is selected in such manner.

On the other hand, when a conventional camera as shown in FIG. 3 is connected, a light-emitting diode D1 is connected to the ready terminal T2 as shown in FIG. 3, so that the voltage of the ready terminal T2 with the constant current I2 supplied from the flash unit is about 2 V, corresponding to the voltage drop by light-emitting diode D1.

When the camera is not connected, the voltage of the ready terminal T2 is approximately equal to the voltage of the power supply, due to the absence of external load to the ready terminal T2 of the flash unit.

When the flash unit is connected to a camera having an accessory shoe with an entirely metallic contact surface, the voltage of the ready terminal T2 becomes equal to ground potential (0 V).

In order to measure the voltage of the ready terminal T2 with the constant current I2, there is provided a circuit composed of resistors R17, R18 and a comparator 310, which compares the voltage of ready terminal T2 with a threshold voltage determined by voltage division with the resistors R17, R18.

Since the voltage of the ready terminal T2 connected to a camera capable of data transfer and supplied with the constant current I2 is about 0.6 V corresponding to a diode, the threshold voltage of the comparator 310 may be selected at a sufficiently different value, for example 1.2 V corresponding to two diodes. Thus, based on the voltage of the ready terminal T2, the comparator 310 provides an input port 6 of the CPU 3 with an H-level signal when:

1) a camera with data transfer function is connected (terminal voltage 0.6 V), or
2) a camera with an accessory shoe with entirely metallic contact surface is connected (terminal voltage 0 V).

On the other hand, the comparator 310 provides the input port 6 of the CPU 3 with an L-level signal when a conventional camera without data transfer function is connected (terminal voltage 2.0 V).

As explained in the foregoing, the flash unit of the present invention shown in FIG. 1 is always capable of discriminating the state of connection between the flash unit and the camera, and the type of the connected camera.

More specifically, if a current is supplied from the camera to the monitor terminal T4, there can be discriminated that a camera capable of TTL light control is connected, and that the power supply in the camera is turned on. Also if data transfer is conducted during the current supply to the monitor terminal T4 from the camera, there can be discriminated connection to a camera with data transfer function. Also connection to a conventional camera can be identified in case of absence of the data transfer.

On the other hand, if a current is not supplied to the monitor terminal T4 from the camera, a current is supplied to terminal T4 from the flash unit, and, if the voltage of the monitor terminal T4 is within a predetermined range, there can be discriminated connection to a camera capable of TTL light control. If the voltage is outside the predetermined range, there can be discriminated absence of connection to a camera or connection to a camera with an accessory shoe of which a contact surface is entirely composed of metal.

Also, during the current supply to the monitor terminal T4, another current can be supplied to the ready terminal T2, and the camera capable of TTL light control is identified as a camera with data transfer function or a conventional camera respectively if the voltage of the ready terminal T2 is less or more than a predetermined value.

When a camera capable of TTL light control is not present, there is identified connection to a camera with an accessory shoe of an entirely metallic contact surface or no connection to a camera, respectively if the voltage of the ready terminal T2 is lower or higher than a predetermined value.

FIGS. 4A, 4B, 5A and 5B are timing charts indicating the modes of discriminating the connection state of camera to the flash unit of the present invention.

Figure 4A:
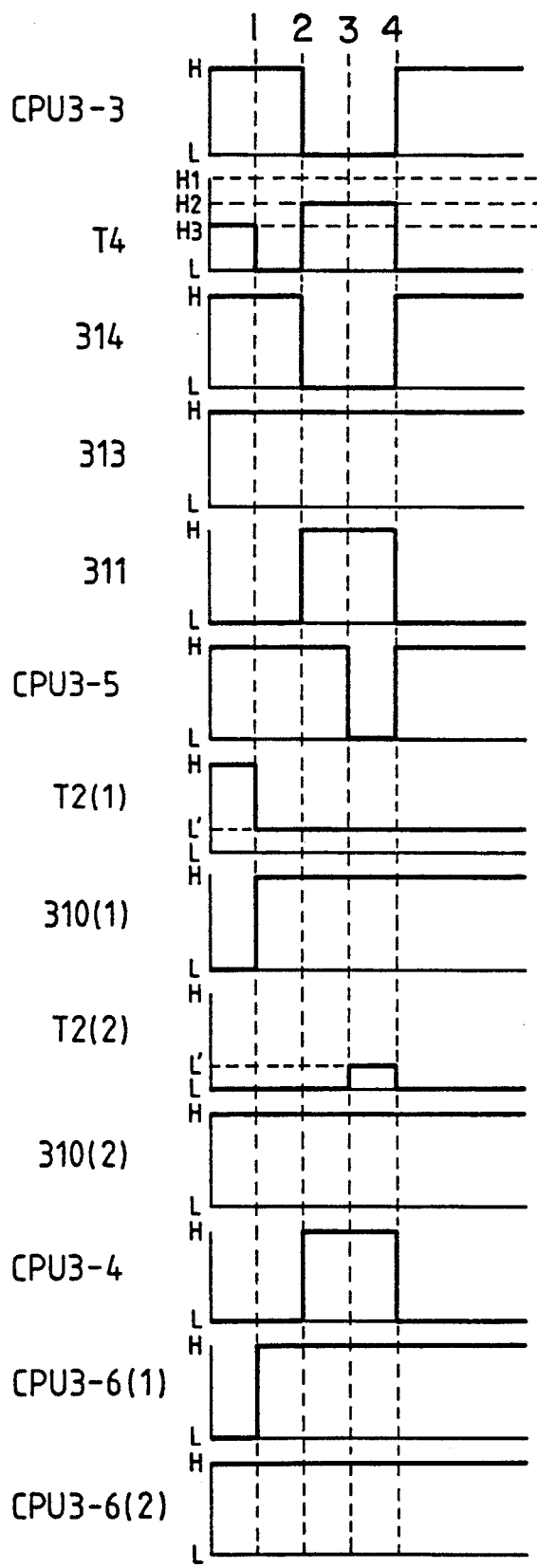
FIGS. 4A, 4B, 5A and 5B are timing charts showing the process of discriminating the state of connection of flash apparatus.

FIG. 4A is a timing chart when a camera with data transfer function is connected.

FIG. 4A shows a state in which the power supply in the camera is turned on until (1) and is turned off at (1). Consequently the voltage of the monitor terminal T4 is maintained at a level H3 of about 0.6 V due to the current supply from the camera until the point (1) but assumes the L-level thereafter.

T2(1) and 310(1) respectively indicate the voltage of the ready terminal T2 and the output signal of the comparator 310 in a state in which the main capacitor C1 is charged to a predetermined voltage and an H-level ready signal is output, while T2(2) and 310(2) indicate those voltage signals in a state without the ready signal.

Thus, during a period up to (1) in which the power supply of the camera is turned on, the ready terminal T2 assumes the H-level or L-level respectively if the flash unit outputs the ready signal or not.

After the power supply of the camera is turned off at (1), the ready terminal T2 assumes the L-level approximately corresponding to the voltage of a diode, as indicated by T2(1), if the ready signal is output, or maintains the L-level, as indicated by T2(2), if the ready signal is not output.

Consequently the output of the comparator 310 is shifted from L- to H-level when the power supply of the camera is turned off at (1), as indicated by 310(1), if the ready signal is output. In the absence of the ready signal, the output remains at the H-level even after the power supply of the camera is turned off at (1), as indicated by 310(2).

The CPU 3 can therefore discriminate, according to the state of the input port 2 receiving the voltage of the monitor terminal T4, whether a current is supplied to monitor terminal T4 from the camera, and understands the absence of current supply from the camera to the monitor terminal T4 after the time (1) at which the power supply of the camera is turned off.

Thus, as indicated by CPU3-3, the CPU 3 shifts the output port 3 to the L-level at a time (2), thereby turning off the transistor TR8 and turning on the transistor TR10 for supplying the monitor terminal T4 with the constant current I4. Since a camera with data transfer function as shown in FIG. 2 is connected to the monitor terminal T4, the voltage thereof is elevated to a voltage H2 (1.2 V) approximately corresponding to two diodes.

In response the output of the comparator 314 is shifted from the H- to L-level, while that of the comparator 313 remains at the H-level. As the output of the comparator 314 is inverted by the inverter 312, the output of the AND gate 311 is shifted from the L- to H-level. Consequently the input port 4 of the CPU 3 is shifted to the H-level, and the CPU 3 discriminates the connection to a camera capable of TTL light control.

Then, at a time (3), the CPU 3 discriminates whether the camera is capable of data transfer.

At (3), the CPU 3 shifts the output port 5 to the L-level to turn on the transistor TR11, thereby supplying the ready terminal T2 and the stop terminal T3 respectively with the constant currents I2, I3. When a camera with data transfer function as shown in FIG. 2 is connected, the voltage of the ready terminal T2 assumes the L-level (0.6 V) corresponding to a diode, in response to the constant current I2, so that the output of the comparator 310 assumes the H-level regardless of the presence or absence of the ready signal from the flash unit. Thus the input port 6 of the CPU 3 will also be at the H-level, and the CPU 3 identifies, from the H-level state of the input ports 4 and 6, the connection of a camera capable of TLL light control and data transfer function.

Figure 4B:
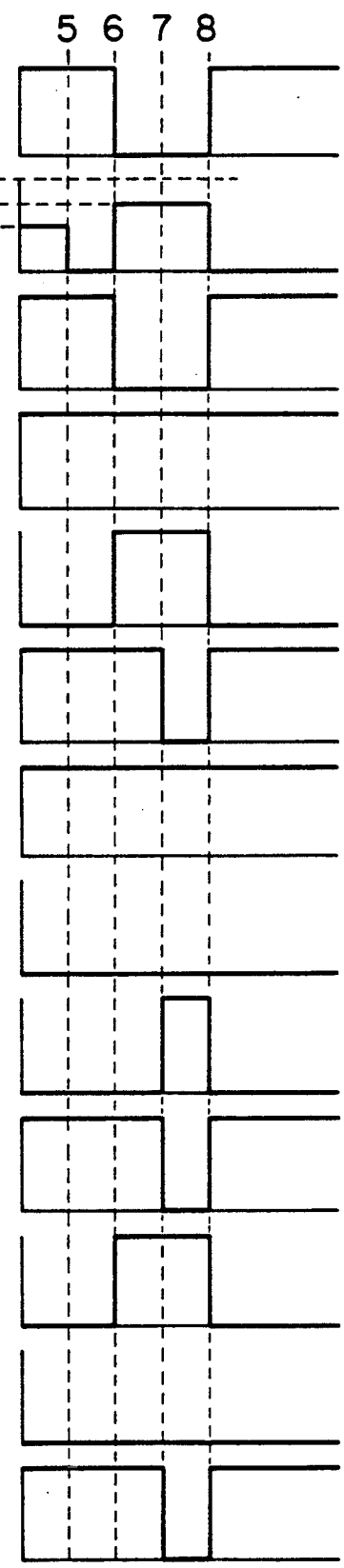

FIG. 4B is a timing chart when a conventional camera capable of TTL light control is connected to the flash unit.

In FIG. 4B, the power supply of the camera is initially turned on but is turned off at (5). The changes in the outputs of the comparators 314, 313 for the voltage of the monitor terminal T4 and the output of the AND gate 311 are the same as in the case of connection of a camera capable of TTL light control, shown in FIG. 4A.

When the power supply of the camera is turned off at (5) in the presence of the ready signal from the flash unit, the voltage of the ready terminal T2 (chart T2(1)) remains at the H-level since the conventional camera shown in FIG. 3 lacks the circuit consisting of the transistor TR2 and the resistor R2 present in the camera with data transfer function shown in FIG. 2, whereby the output of the comparator 310 remains at the L-level (chart 310(1)). On the other hand, in the absence of the ready signal, the voltage of the ready terminal T2 and the output of the comparator 310 are (charts T2(2) and 310(2)) the same as those in FIG. 4A for a camera with data transfer function.

Then at (6), the CPU 3 shifts the output port 3 to the L-level, thereby turning off the transistor TR8 and turning on the transistor TR10, thus supplying the monitor terminal T4 with the constant current I4 for discriminating the connection to a camera capable of TTL light control.

Since the circuit in the camera connected to the monitor terminal T4 is the same in the camera with data transfer function or in the conventional camera as shown in FIGS. 2 and 3, the CPU receives the H-level signal at the input port 4 and identifies a camera capable of TTL light control.

Then, at (7), the CPU 3 shifts the output port 5 to the L-level, thereby turning on the transistor TR11 to supply the ready terminal T2 and the stop terminal T3 respectively with the constant currents I2, I3, and measures the voltage of the ready terminal T2.

The ready terminal T2, receiving the constant current I2 regardless of the presence or absence of the ready signal, assumes the H-level (2.0 V) corresponding to the light-emitting diode D1 provided in the camera, because the conventional camera shown in FIG. 3 lacks the circuit consisting of the transistor TR2 and the resistor R2 in the camera with data transfer function shown in FIG. 2. Consequently the comparator 310 outputs an L-level output regardless of the presence or absence of the ready signal. Thus the CPU 3 identifies, from the H-level state of the input port 4 and the L-level state of the input port 6, connection of a conventional camera capable of TTL light control.

Figure 5A:
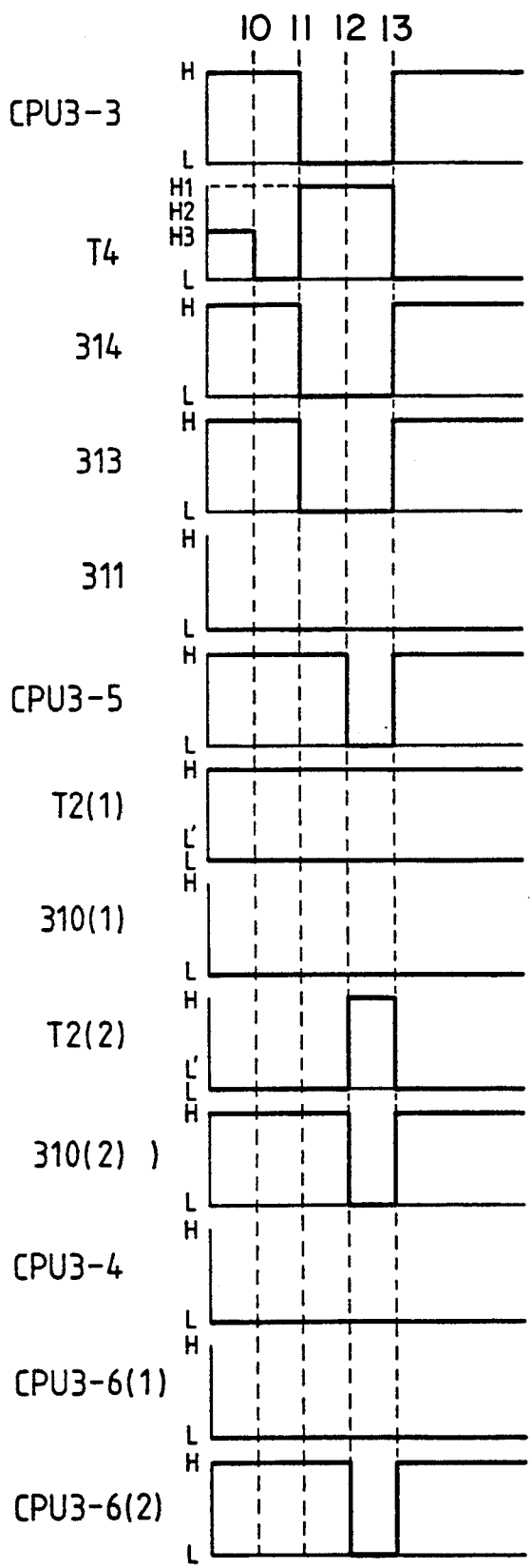

FIG. 5A is a timing chart when the flash unit is detached from the camera.

In FIG. 5A, the flash unit is detached from the camera at a time (10). Because of the detachment, the monitor terminal T4 no longer receives the current supply from the camera, so that the terminal voltage is shifted from the level H3 to the L-level at (10). However this shift does not change the outputs of the comparators 313, 314 and of the AND gate. Also the ready terminal T2 in the presence of the ready signal (chart T2(1)) maintains the H-level state since the voltage is changed merely from the voltage corresponding to the light-emitting diode to that of the power supply. In the absence of the ready signal, the ready terminal T2 remains at the L-level state (chart T2(2)).

Then, at (11), the CPU 3 shifts the output port 3 to the L-level, thereby supplying the monitor terminal T4 with the constant current I4 and discriminating whether the camera is capable of TTL light control. The monitor terminal T4, lacking the connected load, assumes the H-level corresponding to the voltage of the power supply. Consequently the outputs of the comparator 313, 314 and of the AND gate 311 are all in the L-level state. The CPU 3, receiving an L-level signal at the input port 4, identifies the absence of connection to a camera capable of TTL light control.

Then, at (12), the CPU 3 checks the state of the ready terminal T2, by shifting the output port 5 to the L-level, thereby supplying the ready terminal T2 and the stop terminal T3 respectively with the constant currents I2, I3. The ready terminal T2, lacking the connected load, assumes the H-level state regardless of the presence or absence of the ready signal. Consequently the comparator 310 outputs an L-level output, and the CPU 3 identifies, from the L-level states of the input ports 4 and 6, that the flash unit is not mounted on a camera.

Figure 5B:
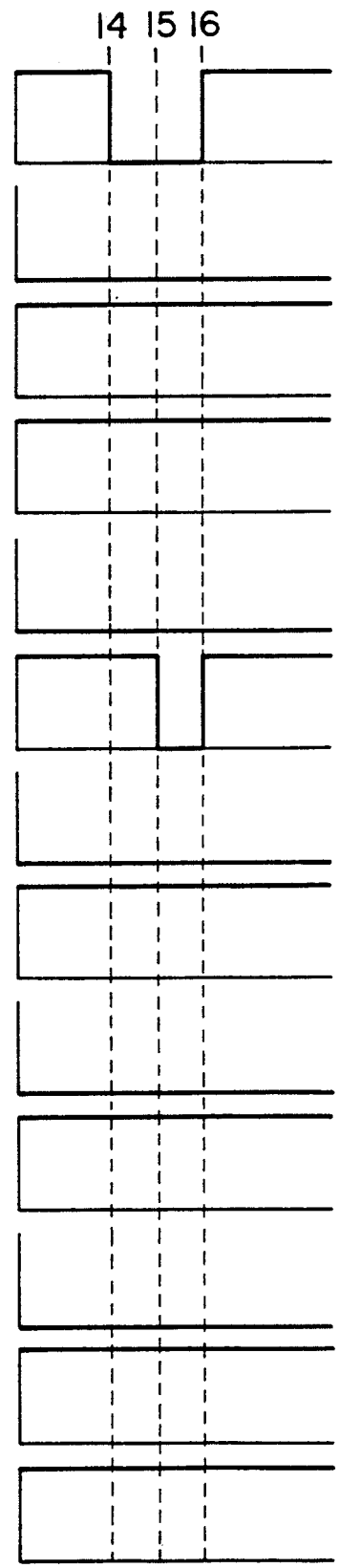

FIG. 5B is a timing chart when the flash unit is mounted on a camera with an accessory shoe of which the contact surface is entirely composed of metal.

In FIG. 5B, the flash unit does not receive the current supply, since the monitor terminal T4 is grounded by the metal accessory shoe. At (14), the CPU 3 supplies the monitor terminal T4 with the constant current I4. However, because of the grounded state, the monitor terminal T4 remains in the L-level state, so that the comparators 313, 314 maintain the H-level output signals. Thus the AND gate 311 sends an L-level signal to the input port 4 of the CPU 3, which thus identifies the absence of connection to a camera capable of TTL light control.

Then, at (15), the CPU 3 checks the state of the ready terminal T2, by shifting the output port 5 to the L-level, thereby supplying the ready terminal T2 and the stop terminal T3 respectively with the constant currents I2, I3.

However, because of the grounded state, the ready terminal T2 shows an L-level voltage regardless of the presence or absence of the ready signal. Consequently the comparator 310 outputs an H-level output, and the CPU 3 identifies, from the L-level state of the input port 4 and the H-level state of the input port 6, connection to a camera having an accessory shoe of which the contact surface is composed of metal.

As explained in the foregoing, in the absence of external current supply to the monitor terminal T4, the CPU 3 shifts the output ports 3, 5 to the L-level to effect current supplies to the monitor terminal T4 and the ready terminal T2, and discriminates the type of camera connected to the flash unit or the absence of connection to a camera, from the state of the input ports 4 and 6.

FIGS. 6A, 6B, 6C, 6D, 7A and 7B are schematic views showing example of a calculating display, for advising the photographer of correct information, based on the identified connection state of the flash unit.

Figure 6A:
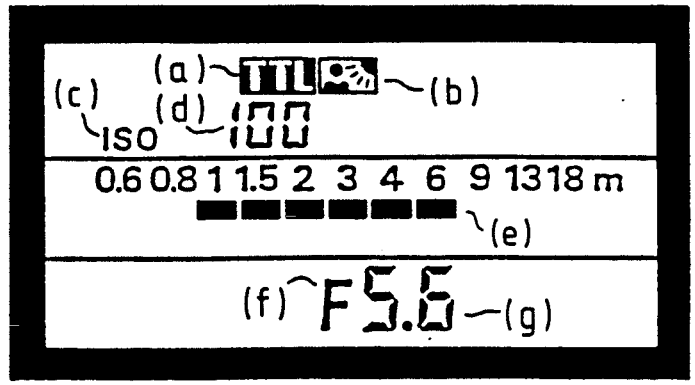
FIGS. 6A, 6B, 6C, 6D, 7A and 7B are views of a flash calculating display of the present invention.

FIG. 6A shows the display when the flash unit is connected to a camera capable of TTL light control and data transfer and when the power supply of the camera is turned on. The display contains following contents:
(a) indicates that the light control is conducted by TTL light control;
(b) indicates that the data transfer function enables other photographing modes, for example daylight flash photographing, in automatic manner;
(c) indicates that the film sensitivity is shown in ISO standards;
(d) indicates ISO film sensitivity;
(e) indicates the distance range in which TTL light control is possible;
(f) indicates that the following number is the diaphragm aperture; and
(g) indicates the diaphragm aperture.

Thus, when connection is made to a camera capable of TTL light control and data transfer and when the power supply of the camera is turned on, the display (b) is given since special photographing modes such as daylight flash photographing are possible. The display (d) indicating the ISO film sensitivity and the display (g) indicating the diaphragm aperture are based on the data obtained from the camera by data transfer. The display (e) indicates the distance range in which the CPU 3 of the flash unit can execute light control, based on the guide number of the flash unit, the ISO film sensitivity and the diaphragm aperture transmitted from, the camera.

Figure 6B:
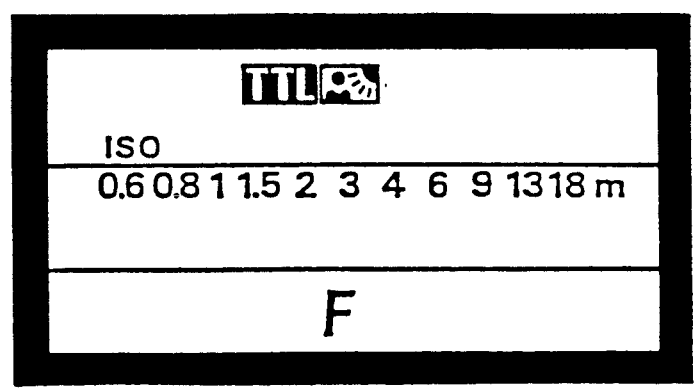

FIG. 6B shows the display for a camera capable of data transfer and TTL light control and the power supply of the camera is turned off.

In the display shown in FIG. 6B, the display (d) for the ISO film sensitivity, the display (g) for the diaphragm aperture and the display (e) for the distance range of light control are removed in comparison to the display shown in FIG. 6A. If the ISO film sensitivity is changed by film replacement or the diaphragm aperture is changed by the rotation of a diaphragm ring while the power supply of the camera is turned off, the flash unit cannot receive such data since the power supply is off. Consequently the displays of previous data may become erroneous and are therefore removed in this state.

Also if the ISO film sensitivity and the diaphragm aperture can be manually set by input means (not shown in FIG. 1) provided in the flash unit while the power supply of the camera is turned off, it is difficult to identify whether the given data were transmitted from the camera or were entered manually, and there may result erroneous displays. Furthermore such data entered in the flash unit will become useless as they are replaced by the data transmitted from the camera when the power supply thereof is turned on.

However, in the present embodiment, the displays based on the data transmitted from the camera are erased when the flash unit is connected to a camera with data transfer function and the power supply of the camera is turned off as shown in FIG. 6B, so that the photographer can know that the erased portions are based on the data transmitted from the camera and can dispense with unnecessary operation.

Furthermore, since the displays based on the data transmitted from the camera are erased, any manipulation of the camera while the power supply thereof is turned off does not provide erroneous data to the photographer, and the displays of correct data as shown in FIG. 6A can be restored by a single operation of turning on the power supply in the camera.

Furthermore, the turned-off state of the power supply of the camera can be recognized immediately since only the displays based on the data transmitted from the camera are erased.

Figure 6C:
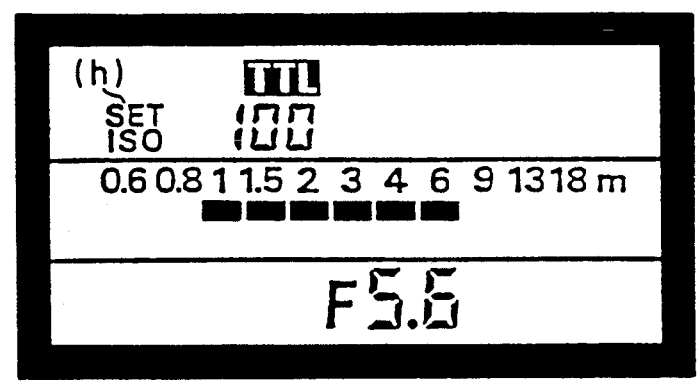
Figure 6D:
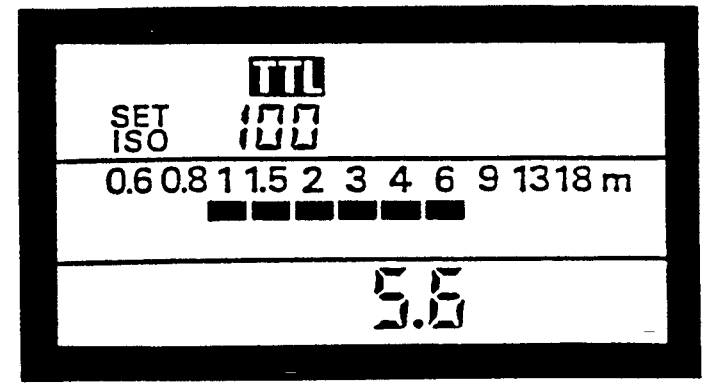

FIGS. 6C and 6D are displays when the flash unit is not connected to a camera or a conventional camera capable of TTL light control is used.

A display (h) in FIG. 6C requests manual setting of the ISO film sensitivity by the input means (not shown) of the flash unit itself. In this state, the display shown in FIG. 6C and that shown in FIG. 6D are alternated. Stated differently, the display "F" indicating the diaphragm aperture flashes.

When the flash unit is connected to a conventional camera capable of TTL light control, the display need not be changed by the on-off state of the power supply, since the ISO value and the diaphragm aperture have to be entered by the input means of the flash unit itself, regardless of the state of the power supply of the camera.

When the flash unit is not connected to a camera, the display is the same as in the case of connection to a conventional camera capable of TTL light control, since the photographer may want to confirm the distance range of light control prior to the connection to the camera, or the photographer may want to use the flash unit for calculating the distance range of light control of another flash unit of the same or similar guide number, or the photographer may want to use the flash unit as a subsidiary unit for photographing with increased number of flash units.

In such connection state, the flash unit of the present embodiment can be used in the same manner as the conventional flash unit by the entry of the ISO value and the diaphragm aperture by the input means (not shown) of the flash unit itself, and the presence of display (h) "SET" requesting the entry of the ISO value and the flashing display (f) "F" requesting the entry of the diaphragm aperture enable the photographer to understand that the ISO value and the diaphragm aperture are not transmitted from the camera but have to be entered by the photographer.

Figure 7A:
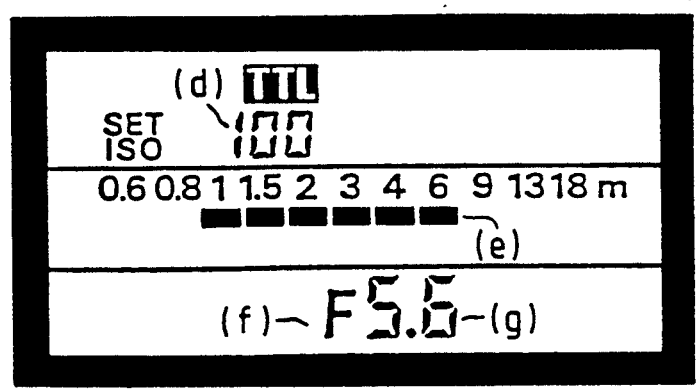
Figure 7B:
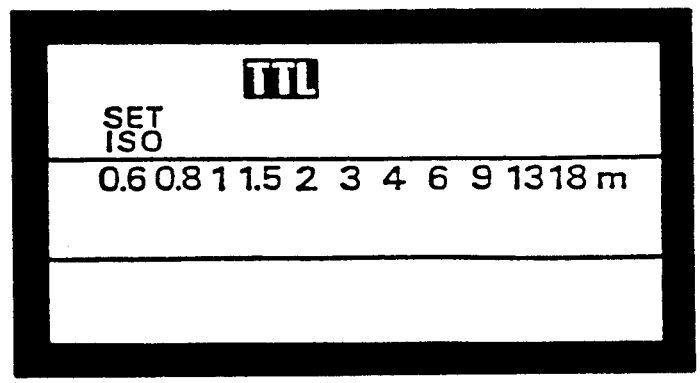

When the flash unit is mounted on a camera with an accessory shoe of which the contact surface is composed of metal, the displays shown in FIGS. 7A and 7B alternate periodically. More specifically, the displays (d) for the ISO value, (e) for the distance range for light control, and (f) and (g) for the diaphragm aperture are intermittently turned on, indicating that the flash unit is not usable.

The photographer can therefore easily recognize that, in the display state shown in FIGS. 7A and 7B, the flash unit is not usable.

As explained in the foregoing, the displays shown in FIGS. 6A, 6B, 6C, 6D, 7A and 7B are selected according to the state of connection to the camera, so that the photographer can easily know the type of camera and can securely prevent error in the photographing operation.

In the following there will be explained the function of the embodiment shown in FIG. 1, particularly the data transfer sequence for effecting data exchange with the camera and the sequence for transmitting a timing signal to the camera for starting the light metering at the shutter release operation.

The flash unit of the present invention shown in FIG. 1 executes data transfer and transmission of a light metering start signal when it is connected to a camera capable of data transfer shown in FIG. 2.

At first there will be explained the function of the camera and the flash unit when it is connected to the camera capable of data transfer shown in FIG. 2.

FIG. 2 shows a camera capable of TTL light control and data transfer, in which the closing of a switch SW1 initiates the supply of electric power of a power source E1 to various units, thereby activating the camera.

A camera control circuit 102 executes the controls for operations such as mirror movement, movement of diaphragm and shutter, advancement and rewinding of film, lens focusing etc., controls on the displays such as those in the view-finder, controls on the measurements of luminance and distance of the object, focal length of the mounted lens, aperture of diaphragm etc. These controls are conducted by the instructions of a CPU 1 (101), and the results of measurements are given thereto.

Also the CPU 1 executes control on operations such as shutter releasing operation, calculations for example of diaphragm aperture and shutter speed based on the measured luminance of the object, and a data transfer process for transmitting the data of the camera to the flash unit and receiving the data thereof.

In the following there will be explained the data transfer sequence with reference to FIGS. 1, 2 and 8.

The CPU 1 outputs clock signals from an output port 1, and outputs data from an output port 3 in synchronization with the clock signals. It also fetches data from an input port 4, in synchronization with clock signals entered into an input port 2.

In the normal state, the CPU 1 maintains output ports 1, 3 at the H-level, whereby inverters 103, 104 generate L-level output signals to turn off transistors TR1, TR3.

Since the power supply of the camera is turned on, the base of a transistor TR2 is maintained at the voltage of the power supply, which is higher than the forward voltage of a light-emitting diode D1, whereby the transistor TR2 is turned off.

In such normal state, when a current is supplied from the flash unit to a ready terminal T2, the voltage thereof assumes the H-level depending on the voltage of the light-emitting diode D1.

The camera control circuit 102 receives the voltage of the ready terminal T2 through an input port 2 and transmits the state of the ready terminal T2 to the CPU 1. In response the CPU 1 executes photographing with automatic exposure under normal illumination or photographing with flash, respectively when the ready terminal T2 is at the L- or H-level.

The CPU 1 ignores the state of the ready terminal T2 during the data transfer, and stores the state of the ready terminal prior to the data transfer.

An output port 3 of the camera control circuit 102 outputs an L-level light stop signal to the stop terminal T3, in the course of photographing with flash, when the object reaches an appropriate luminance by the flash emission.

In the normal state the stop terminal T3 is pulled up by a resistor R19 and is maintained at the H-level.

An output port 5 of the CPU 1 outputs a signal representing the data transfer sequence.

In the normal state, the CPU 1 maintains the output port 5 at the L-level, thereby turning a transistor TR6 off. In the data transfer sequence, the output port 5 is shifted to the H-level to turn on the transistor TR6, thereby outputting an L-level signal to the monitor terminal T4.

The CPU 3 of the flash unit outputs clock signals from an output port 7, and also outputs data from an output port 9 in synchronization with the clock signals. Also CPU 3 fetches data from an input port 10, in synchronization with the clock signals supplied from the ready terminal T2 to an input port 8.

In the normal state the CPU 3 maintains the output ports 7, 9 at the H-level to generate L-level output signals from inverters 308, 309, whereby transistors TR12, TR13 are turned off.

An output port 5 of the CPU 3 controls the current supply to the stop terminal T3 and the ready terminal T2. In the normal state, output port 5 of the CPU 3 is maintained at the H-level to turn off a transistor TR11, whereby the terminals T2, T3 do not receive the supply of constant currents I2, I3. Upon entering the data transfer sequence, the CPU 3 shifts the output port to the L-level, whereby the transistor TR11 is turned on to supply the ready terminal T2 and the stop terminal T3 respectively with the constant currents I2, I3.

In the normal state, a current is supplied to the stop terminal T3 through the resistor R19. In case of photographing with plural flash units, the stop terminals of the additional flash units may be connected in parallel manner to the stop terminal T3. Thus the camera may become unable to output the light stop signal if the resistance of the resistor R19 is reduced, because the stop terminal T3 of the camera will receive an increased current in such photographing with plural flash units, and, for this reason, the resistance of the resistor R19 has to be made large. However an increased resistance reduces the current supplied to the stop terminal T3, thus prohibiting high-speed digital data transfer. Also the data transfer is not possible in the absence of the ready signal from the flash unit, since the ready terminal T2 does not receive the current.

However the flash unit of the present invention is not adversely affected by photographing with plural flash units, and is capable of high-speed digital data transfer regardless of the presence or absence of the ready signal, since the constant currents I2, I3 are respectively supplied to the ready terminal T2 and the stop terminal T3 in the data transfer sequence.

In the following there will be explained the data transfer sequence, with reference to a timing chart shown in FIG. 8A.

Figure 8A:
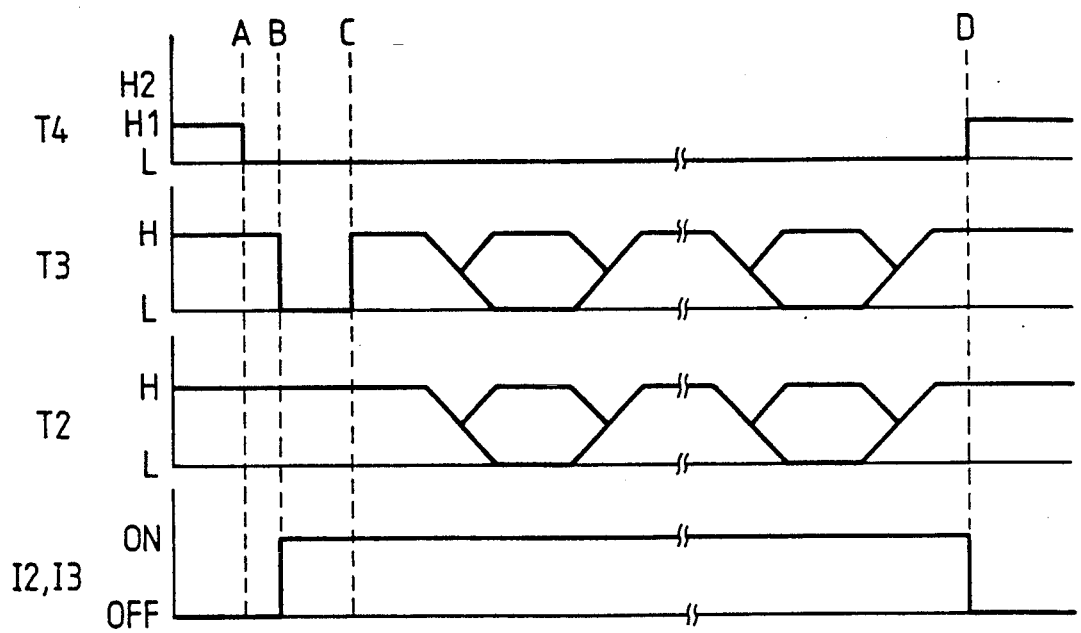
FIGS. 8A and 8B are charts explaining a data transfer sequence and a sequence for transmitting the timing of start of light measurement.

In FIG. 8A, a normal state is shown up to a time A. In the normal state in which the power supply of the camera is turned on and the TTL light control is possible, the camera control circuit 102 maintains the output port 5 at the L-level, in order to indicate that the sequence for transmitting the timing of start of light metering, to be explained later, is not conducted, whereby the transistor TR5 is turned on to supply the monitor terminal T4 with the constant current I1. In response, for effecting the TTL light control, the flash unit maintains the monitor terminal T4 approximately at the voltage of a diode through the transistors TR7, TR8.

The monitor terminal T4 of the camera is connected to a circuit composed of the diode D2, resistors R5, R6 and transistor TR4. Since this circuit shows a voltage of about two diodes upon receiving a current, the transistor TR4 is not turned on if the voltage of the monitor terminal T4 is less than a value corresponding to two diodes.

If the monitor terminal T4 is not connected to a load, the constant current I1 flows through the diode D2, resistor R5 and base and emitter of the transistor TR4, thereby turning transistor TR4 on, whereby the input port 4 of the camera control circuit 102 is shifted to the L-level.

When the flash unit shown in FIG. 1 is connected, the voltage of the monitor terminal T4 assumes a value corresponding to a diode, whereby the transistor TR4 is turned off and the input port 4 of the camera control circuit 102 assumes the H-level state.

In this manner the camera control circuit 102 can discriminate, according to the state of the input port 4, the connection of a flash unit capable of TTL light control, and sends the result of the discrimination to the CPU 1. More specifically the camera control circuit 102 identifies the presence or absence of a flash unit capable of TTL light control, respectively if the input port 4 of the camera control circuit 102 is at the H- or L-level.

In the data transfer sequence or in the sequence for transmitting the timing of start of light metering, the CPU 1 stores the state of the monitor terminal T4 prior to the sequence.

The data transfer sequence is started from a time A shown in FIG. 8A.

At the time A, the CPU 1 shifts the output port 5 to the H-level to turn on the transistor TR6 thereby shifting the monitor terminal T4 to the L-level and requesting the data transfer from the flash unit.

In response the input port 2 of the CPU 3 of the flash unit assumes the H-level, whereupon the CPU 3 enters the data transfer sequence.

Then the CPU 3 shifts the output port 9 to the H-level at a time B to turn on the transistor TR13, thereby shifting the stop terminal T3 to the L-level and informing the camera of the start of the data transfer sequence.

At the same time the CPU 3 of the flash unit shifts the output port 5 to the L-level, to supply the ready terminal T2 and the stop terminal T3 respectively with the constant currents I2, I3, thereby enabling high-speed data transfer.

The CPU 1 of the camera maintains the stop terminal T3 at the L-level state up to a time C. During this period, the CPU 1 of the camera and the CPU 3 of the flash unit perform preparations for the data transfer, such as the setting of data to be transmitted and of the memory area for the received data. Also the CPU 3 of the flash unit confirms that the ready terminal T2 does not assume the L-level state in the period to the time C. If the ready terminal T2 assumes the L-level state in this period, the CPU 3 enters the sequence for transmitting the timing of start of light metering, to be explained later.

If the ready terminal T2 remains at the H-level up to the time C, the CPU 3 shifts the stop terminal to the H-level, thus requesting the data transmission from the camera.

Thereafter data exchange is conducted between the flash unit and the camera, and, upon completion thereof, the flash unit terminates the supply of constant currents I2, I3 to the ready terminal T2 and the stop terminal T3 at a time D, while the camera simultaneously re-starts the supply of the constant current I1 to the monitor terminal T4, whereby the data transfer sequence is terminated.

In the following there will be explained the start timing transmitting sequence for light metering, with reference to FIG. 8B.

When a shutter release switch SW2 of the camera is closed, the camera control circuit 102 executes a shutter releasing operation according to a sequence instructed by the CPU 1, thus exposing the film. The sequence shown in FIG. 8B defines the signal exchange with the flash unit, and a light metering start signal is transmitted from the flash unit to the camera according to the timing chart shown in FIG. 8B.

Figure 8B:
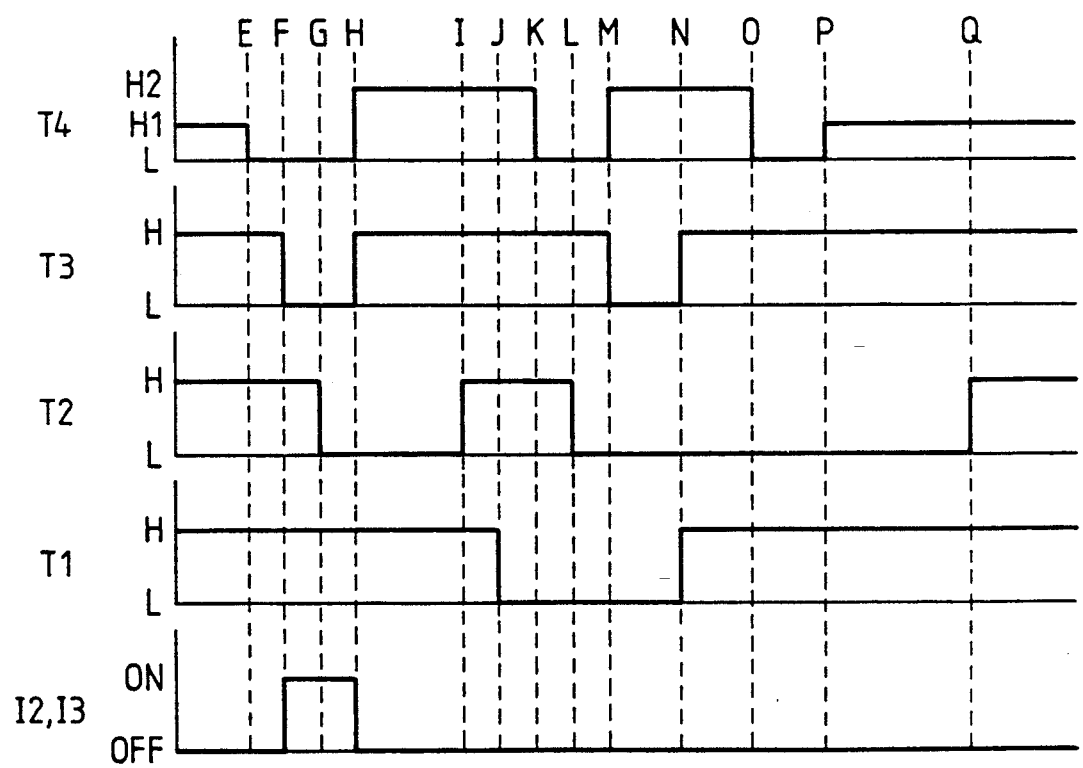

In FIG. 8B the normal state continues to a time E, at which the release switch SW2 of the camera is closed to start the shutter releasing operation. In response the camera control circuit 102 shifts the output port 5 to the H-level to turn off the transistor TR5, thereby terminating the supply of the constant current I1 to the monitor terminal T4 and shifting that terminal to the L-level.

In response the flash unit shifts the stop terminal T3 to the L-level at a time F as the preparation for data transfer, and supplies the ready terminal T2 and the stop terminal T3 respectively with the constant currents I2, I3.

In order to inform the flash unit of the shutter releasing operation, the CPU 1 shifts the output port 1 to the L-level at a time G, thereby shifting the ready terminal T2 to the L-level.

The flash unit recognizes the transmitting sequence for the light metering start timing, from the L-level state of the ready terminal T2, and the CPU 3 terminates the current supply to the ready terminal T2 and the stop terminal T3 at time G and shifts the output port 3 to the L-level, thereby supplying the monitor terminal T4 with the constant current I4. Also since the output port 3 of the CPU 3 is at the L-level, the inverter 315 outputs an H-level output signal to open the AND gate 316.

The camera recognizes, from the supply of the constant current I4 from the flash unit to the monitor terminal T4 and the turning on of the transistor TR4, that the flash unit has entered the transmitting sequence for the light metering starting timing, and the CPU 1 shifts the output port 1 to the H-level at a time I, thereby shifting the ready terminal T2 to the H-level.

In the period up to the time I, the camera executes shutter releasing operations such as mirror lifting, diaphragm aperture control and releasing of leading shutter curtain.

When the shutter is fully opened at a time J by the running of the leading curtain, the camera control circuit 102 shifts the output port 1 and the X-contact terminal T1 to the L-level, and then instructs the start of flash emission.

However, due to a delay for example caused by capacitative components in the circuits of the camera and the flash unit, the actual flash emission from the xenon discharge tube Xe of the flash unit starts from a time K.

Upon flash emission from the discharge tube Xe at the time K, the light start circuit 2 outputs an H-level output signal. Since the AND gate 316 is opened in this state as explained before, an H-level output signal is output therefrom to turn on the transistor TR9, thus shifting the monitor terminal T4 to the L-level.

The camera identifies the L-level state of the monitor terminal T4 as a light metering start signal and initiates the measurement of the luminance of the object.

As the light emission from the flash unit consumes energy charged in the main capacitor C1, the voltage thereof becomes lower than a predetermined value at a time L, whereby the ready signal assumes the L-level.

The object is illuminated by the light emission from the flash unit, and, in the course of the measurement of luminance of the object, the exposure to the film reaches an appropriate amount at a time M, when the camera control circuit 102 releases an L-level pulse to the stop terminal T3.

In response the flash unit terminates the light emission, and the output port 2 of the light start circuit 304 is shifted to the L-level, whereby the transistor TR9 is turned off to re-start the supply of the constant current I4 to the monitor terminal T4.

Thereafter the shutter releasing operations such as the running of trailing shutter curtain are completed at a time N, whereupon the camera control circuit 102 shifts the output port 1 and the X-contact terminal to the H-level.

After this sequence, the flash unit shifts the output port 3 of the CPU 3 to the H-level at a time O, thereby terminating the current supply to the monitor terminal T4 and indicating the completion of the sequence.

The camera recognizes the completion of the sequence from the termination of current supply to the monitor terminal T4, and re-starts the current supply to the monitor terminal T4 at a time P, thereby completing the transmitting sequence of the light metering start timing.

Thereafter the flash unit charges the main capacitor C1, and outputs the ready signal again at a time Q, thereby shifting the ready terminal T2 to the H-level.

In the following there will be explained the function of the flash unit of the present invention shown in FIG. 1, when it is connected to a conventional camera capable of TTL light control shown in FIG. 3.

Referring to FIG. 3, the closing of a switch SW1 supplies the electric power to various units from a power source E2, thus activating the camera.

A camera control circuit 202 executes the controls for operations such as mirror movement, movement of diaphragm and shutter, advancement and rewinding of film, lens focusing etc., controls on the displays such as those in the view-finder, controls on the measurements of luminance and distance of the object, focal length of the mounted lens, aperture of diaphragm etc. These controls are conducted by the instructions of a CPU 2 (201), and the results of measurements are given thereto.

In the conventional camera, the constant current I1 is supplied to the monitor terminal T4, during the closed state of the switch SW1. Consequently the monitor terminal T4 does not assume the L-level state while the power supply of the camera is turned on, so that the flash unit does not enter the data transfer sequence nor the transmitting sequence of the light metering start timing. Consequently the flash unit can be prevented from unnecessary operations of current supply to the monitor terminal T4 from the flash unit outputting of clock signals or data, and shift of the stop terminal T3 to the L-level.

Even when the shutter of the conventional camera is released or when a test flash emission is made from the flash unit by the manipulation of the test flash switch SW4 while the power supply of the camera is turned on, the current supply to the monitor terminal T4 is continued from the camera, so that the transmitting sequence for the light metering start timing is not initiated and the CPU 3 of the flash unit maintains the output port 3 at the H-level. Consequently the AND gate 316 is always maintained closed, and the erroneous shift of the monitor terminal T4 to the L-level can be prevented.

If a test light emission is made from the flash unit by the manipulation of the test switch SW4 when the flash unit is connected to a camera capable of TTL light control with the power supply on, the CPU 3 maintains the output port 3 at the H-level. Thus it is possible to prevent the supply of an erroneous signal to the camera, resulting from the shift of the monitor terminal T4 to the L-level.

As explained in the foregoing, the flash unit of the present invention, when connected to a camera capable of data transfer and TTL light control, can execute the new functions of data transfer and release of the light metering start signal only after the monitor terminal T4 is shifted to the L-level by the camera. The flash unit can therefore avoid erroneous data transfer or erroneous release of the light metering starting signal when it is connected to a conventional camera lacking the data transfer function or when any manipulation is conducted on the flash unit, thus preventing the camera from any erroneous operation.

Consequently the flash unit, though being provided with special functions such as data transfer, can achieve flash photographing operation in the conventional manner when it is connected to a conventional camera.

Also when the flash unit is connected to a camera capable of data transfer, there will be no unnecessary activation of the auxiliary auto focusing light because of the absence of data transfer, in contrast to the art disclosed in U.S. Pat. No. 4,804,991.

Also even if data are output erroneously from the camera, for example by noise, the auxiliary auto focusing light is still not activated, since the monitor terminal T4 is maintained at the L-level.

On the other hand, when the camera, requests the data transfer sequence to the flash unit, the flash unit responds by shifting the stop terminal at first to the L-level and then to the H-level, so that the time from the request of the data transfer sequence to the actual data transfer can be reduced.

Also the transmitting sequence of the light metering start timing can be easily identified from the L-level states of the monitor terminal T4 and the ready terminal T2. Consequently this sequence can be started within a short time, and the time lag from the shutter releasing operation in the camera to the actual photographing operation can be reduced.

As explained in the foregoing, the present invention enables secure discrimination whether the flash unit is connected to a camera, and whether the connected camera is a camera capable of TTL light control and data transfer, or a camera capable of TTL light control but incapable of data transfer, or a camera with an accessory shoe of which the contact surface is composed of metal, regardless of the on-off state of the power supply in the camera.

Also since the displays are altered according to thus discriminated state of connection of the flash unit, the photographer can easily understand the type of camera connected to the flash unit. Also in a connection state in which the flash photographing is not possible, an alarm is given by a flashing display, thereby avoiding erroneous manipulation of the flash unit.

Also in case data transfer is requested from the camera, there is given a response from the flash unit, so that the time from the request to the start of actual data transfer can be reduced. Also the response from the flash unit can securely prevent eroneous data transfer, leading to erroneous operation of the flash unit.

Furthermore, since the request for light metering start signal from the camera is made with two signal lines, the flash unit can clearly understand the sequence requested from the camera. It is therefore possible to make a quick response to the request and to reduce the time lag from the shutter releasing operation to the actual photographing operation.

Furthermore, since the flash unit can clearly understand the request from the camera, it can immediately move to the transmitting sequence of the light metering starting timing even if the data transfer sequence is erroneously started for example by noise, and erroneous operations resulting from noise can be securely prevented.

Furthermore, since the functions of the flash unit are conducted according to the requests from the camera, no erroneous operations are induced in the camera or in the flash unit when it is connected to a camera without the data transfer function, and, in such case, the flash unit can be used as a conventional flash unit.

Furthermore, the data transmitting line receives the current supply from the flash unit only in the data transfer operation, so that erroneous operation can be prevented in photographing with plural flash units, and the data transfer can be conducted at a high speed.

What is claimed is:

1. An electronic flash apparatus for use with a camera which selectively assumes an information transfer state capable of effecting information transfer to said electronic flash apparats or a flash photographing state capable of effecting a flash photographing operation, comprising:
a terminal to be electrically connected to said camera, said terminal inputting a light stop signal from said camera for stopping a flashing operation of said electronic flash apparatus, said electronic flash apparatus transferring information to said camera through said terminal;
current supply means for supplying current to said terminal; and
discriminating means for discriminating whether said camera is in said information transfer state or is in said flash photographing state, said discriminating means causing said current supply means to supply first current to said terminal when said discriminating means discriminates that said camera is in said information transfer state, said discriminating means causing said current supply means to supply second current to said terminal, which is lower than said first current, when said discriminating means discriminates that said camera is in said flash photographing state.

2. An electronic flash apparatus for use with a camera which selectively assumes an information transfer state capable of effecting information transfer to said electronic flash apparatus or a flash photographing state capable of effecting a flash photographing operation, comprising:
a main capacitor;
charge detecting means for detecting that said main capacitor is charged to a voltage higher than a predetermined value and generating a charge completion signal;
a terminal for transferring said charge completion signal to said camera when said terminal is electrically connected to said camera, said camera transferring information to said electronic flash apparatus through said terminal;
current supply means for supplying current to said terminal; and
discriminating means for discriminating whether said camera is in said information transfer state or is in said flash photographing state, said discriminating means causing said current supply means to supply first current to said terminal when said discriminating means discriminates that said camera is in said information transfer state, said discriminating means causing said current supply means to supply second current to said terminal, which is lower than said first current, when said discriminating means discriminates that said camera is in said flash photographing state.

3. An electronic flash apparatus for use with a camera, wherein said camera has a circuit which operates when a power source supplies power to said circuit, comprising;
terminal means having at least one terminal to be electrically connected to said camera;
receiving means for receiving information regarding flash photography through said terminal means;
detecting means operative when said power source does not supply power to said circuit for supplying current to at least one terminal of said terminal means and for detecting a resulting voltage of that terminal; and
discriminating means responsive to said detecting means and operative when said power source does not supply power to said circuit for discriminating based on said resulting voltage whether or not said camera can transfer information regarding flash photography.

4. An electronic flash apparatus according to claim 3, which further comprises means for displaying whether or not said camera can transfer data regarding flash photography.

5. An electronic flash apparatus according to claim 3, which further comprises a main capacitor and charge detecting means for detecting that said main capacitor is charged to a voltage higher than a predetermined value and generating a charge completion signal, wherein said terminal means has a charge completion terminal for transferring said charge completion signal to said camera, and wherein the first-mentioned detecting means supplies current to said charge completion terminal and compares a resulting voltage of said charge completion terminal with a predetermined value.

6. An electronic flash apparatus according to claim 5, wherein said terminal means has a monitor terminal for connection to said camera, and wherein the first-mentioned detecting means supplies current to said monitor terminal and compares a resulting voltage of said monitor terminal with another predetermined value.

7. An electronic flash apparatus for use with a camera capable of selectively assuming an information transfer state for effecting information transfer to the electronic flash apparatus or a flash photographing state for effecting a flash photographing operation, and generating a shutter release signal in said flash photographing state in response to a shutter releasing operation, comprising:

- a monitor terminal to be electrically connected to said camera;
- a light stop terminal to be electrically connected to said camera;
- a charge completion terminal to be electrically connected to said camera, for receiving said shutter release signal from said camera;
- wherein the information transfer between said camera and said electronic flash apparatus is conducted through said light stop and charge completion terminals when the camera is in the information transfer state, while, in the flash photographing state, a light stop signal and a charge completion signal, respectively, are applied to said light stop terminal and said charge completion terminal;
- voltage varying means for varying voltage applied to said light stop terminal;
- first voltage detecting means for detecting voltage applied to said monitor terminal; and
- second voltage detecting means for detecting voltage applied to said charge completion terminal;
- said first voltage detecting means being responsive to a change in the voltage on said monitor terminal to cause said voltage varying means to change voltage on the light stop terminal for a predetermined period and to cause said second voltage detecting means to inspect voltage on said charge completion terminal;
- said second voltage detecting means being responsive to a change in voltage on said charge completion terminal, caused by receipt on said charge completion terminal of said shutter release signal of said camera during said predetermined period, to identify that the camera is in the flash photographing state, and being responsive to the absence of the voltage change on said charge completion terminal during said predetermined period to identify that said camera is in the information transfer state.

8. An electronic flash apparatus according to claim 3, wherein said detecting means supplies current to a plurality of terminals of said terminal means and detects resulting voltages of said terminals, and said discriminating means discriminates based on said voltages whether or not said camera can transfer information regarding flash photography.

* * * * *

UNITED STATES PATENT AND TRADEMARK OFFICE
CERTIFICATE OF CORRECTION

| | | |
|---|---|---|
| PATENT NO. | : 5,063,403 | |
| APPLICATION NO. | : 07/659547 | |
| DATED | : November 5, 1991 | |
| INVENTOR(S) | : Norikazu Yokonuma et al. | |

It is certified that error appears in the above-identified patent and that said Letters Patent is hereby corrected as shown below:

IN CLAIM 1:

Claim 1, line 4 Col. 19: "apparats" should read --apparatus--.

Signed and Sealed this

Seventh Day of August, 2007

JON W. DUDAS
*Director of the United States Patent and Trademark Office*